United States Patent [19]

Carlin et al.

[11] Patent Number: 4,800,070
[45] Date of Patent: Jan. 24, 1989

[54] CATALYSTS FOR ABSORPTIVE AIR SEPARATION

[75] Inventors: Richard T. Carlin, Buffalo, N.Y.; Brian R. Dunbobbin, Allentown, Pa.

[73] Assignee: Air Products and Chemicals, Inc., Allentown, Pa.

[21] Appl. No.: 94,637

[22] Filed: Sep. 8, 1987

[51] Int. Cl.$^4$ .............................................. C01B 13/00
[52] U.S. Cl. ................................. 423/210.5; 423/219; 423/579
[58] Field of Search ...................... 423/579, 210.5, 219

[56] References Cited

U.S. PATENT DOCUMENTS

| | | | |
|---|---|---|---|
| 70,705 | 11/1867 | Du Motay et al. ................. | 423/579 |
| 2,004,243 | 6/1935 | Hloch .................................. | 423/579 |
| 4,132,766 | 1/1979 | Erickson ............................. | 423/579 |
| 4,287,170 | 9/1981 | Erickson ............................. | 423/579 |
| 4,340,578 | 7/1982 | Erickson ............................. | 423/579 |
| 4,529,577 | 7/1985 | Chen et al. .......................... | 423/351 |
| 4,565,685 | 1/1986 | Cassano .............................. | 423/579 |

FOREIGN PATENT DOCUMENTS

| | | | |
|---|---|---|---|
| 7524 | 1/1980 | Japan .................................. | 423/579 |
| 3034 | 8/1891 | United Kingdom ................ | 423/579 |
| 628572 | 8/1949 | United Kingdom ................ | 423/579 |

OTHER PUBLICATIONS

"The Effects of Catalytic or Promotor Oxides on the Brin Process," John L. Moriarty, Jr., *Iowa Academy of Sciences Proceedings*, vol. 77, Apr. 10, 1971, pp. 360-378.
"Mechanism in an Ionic Matrix . . . " F. Pariccia and P. G. Zambonin, J. Phys. Chem. 78 1693 (1974).
"Oxides/Oxygen Systems in Molten Alkali Nitrates: . . . ", P. G. Zambonin, Electroanalytical Chem. and Interface Electrochemistry, 45, 451 (1973).
"Voltammetric Behavior . . . " P. G. Zambonin, Anal. Chem. 44, 763 (1972); P. G. Zambonin Anal. Chem. 43, 1571, (1971).
"Differential Pulse Voltammetry . . . " F. Palimisano, L. Sabbatini and P. G. Zambonin, J. Chem. Soc. Faraday Trans. 1, 80, 1029 (1984).
"Nitrate/Nitrite Chemistry . . . " D. A. Nissen and D. E. Meaker, Inorg. Chem. 22, 716 (1983).
"Evaporation of NaNO$_3$, . . . ", C. M. Kramer, Z. A. Munin and K. H. Stern, High Temp. Sci. 16, 257 (1983).
"The Effect of Cations on the Thermal Decomposition of Salts with Oxyanions" K. H. Stern, J. Shem Education, 46, 645 (1969).
"Cation Effects on the Electrode Reduction . . . ", M. H. Miles and A. N. Fletcher, J. Electrochem. Soc., 127, 1761 (1980).
"Molten Salts as Nonaqueous Solvents", D. H. Kerridge, *The Chemistry of Nonaqueous Solvents*, J. J. Lagowski, ed., Academic Press, New York, 1978, pp. 269-329.
"Establishment of an Acidity–Potential Diagram . . . ", E. Plumat, A. Labani, and M. Ghodsi, J. Electrochem. Soc. 130, 2192 (1983).
"Advanced Inorganic Chemistry, A Comprehensive Text", F. Albert Cotton and Geoffrey Wilkinson, A Wiley–Interscience Publication, (p. 691).

*Primary Examiner*—John Doll
*Assistant Examiner*—Wayne A. Langel
*Attorney, Agent, or Firm*—Geoffrey L. Chase; James C. Simmons; William F. Marsh

[57] ABSTRACT

The present invention is directed to catalysts for the absorptive separation of oxygen from oxygen-containing gas mixtures, such as air, using reversible chemical reaction systems, such as,

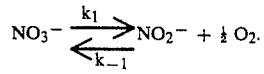

$$NO_3^- \underset{k_{-1}}{\overset{k_1}{\rightleftharpoons}} NO_2^- + \tfrac{1}{2} O_2.$$

The catalytic action is the result of the addition of transition metal oxides to the oxygen accepting system.

8 Claims, 4 Drawing Sheets

ACTIVITY OF 3 mol % CATALYST

○ 3% Na$_2$O$_2$
□ 3% NaRuO$_4$
△ 3% KMnO$_4$

POINT 1 = INITIAL ACTIVITY
POINT 2 = ACTIVITY AT 1 HOUR
POINT 3 = ACTIVITY UNDER 1465 PPM NO$_2$
POINT 4 = ACTIVITY UNDER 1343 PPM NO$_2$ AND 438 CO$_2$

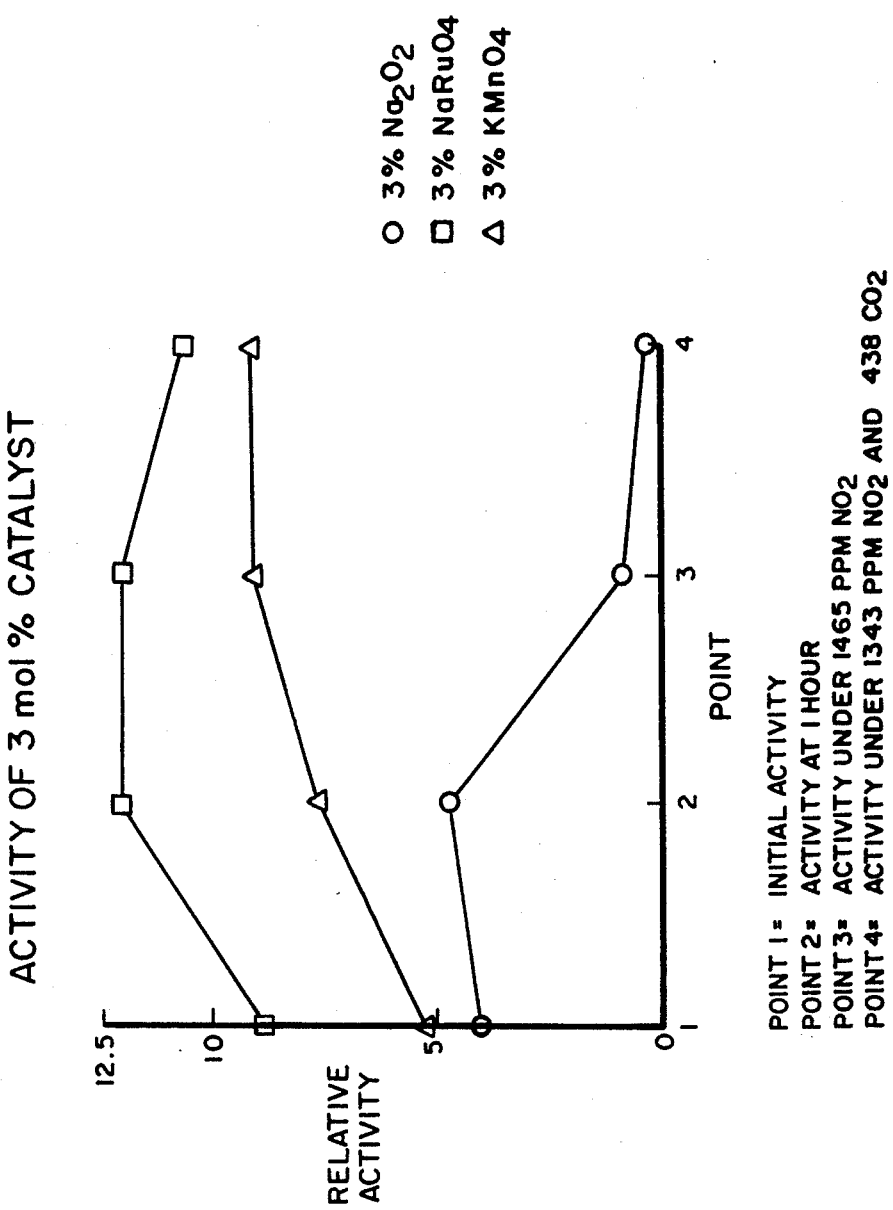

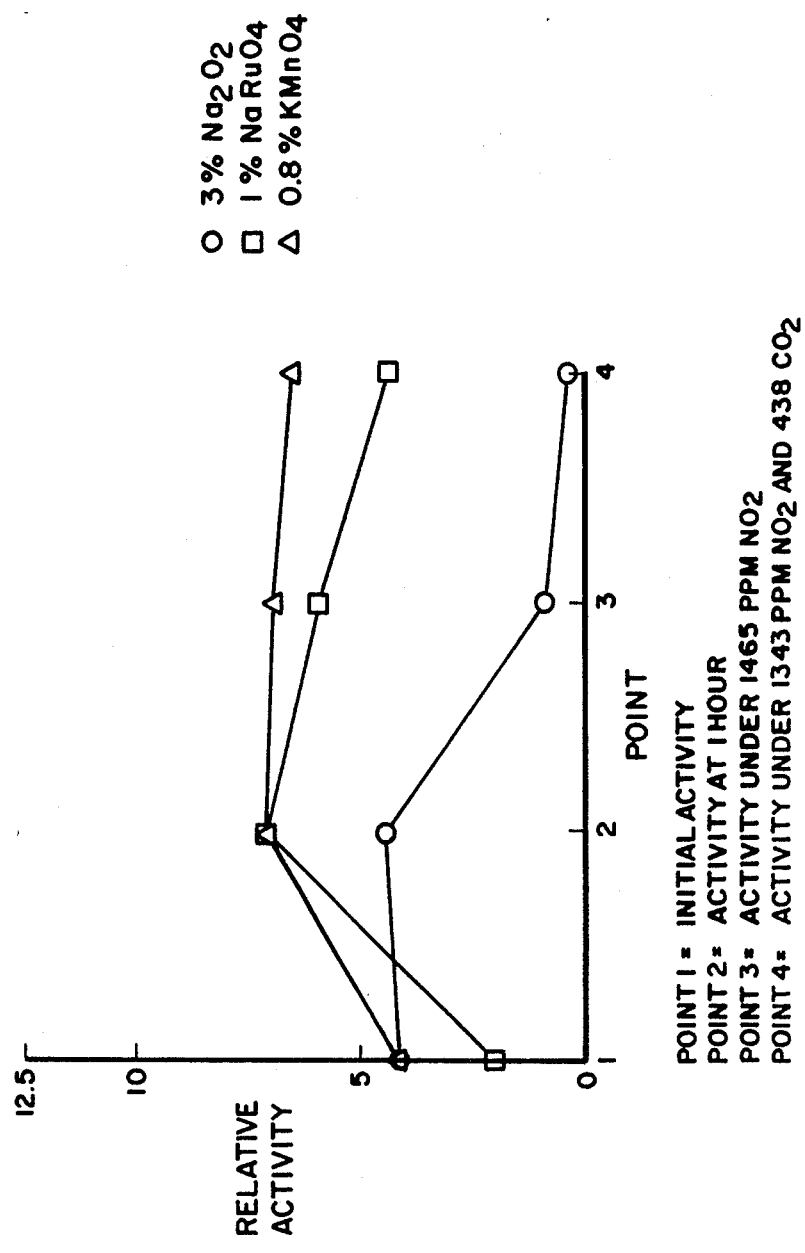

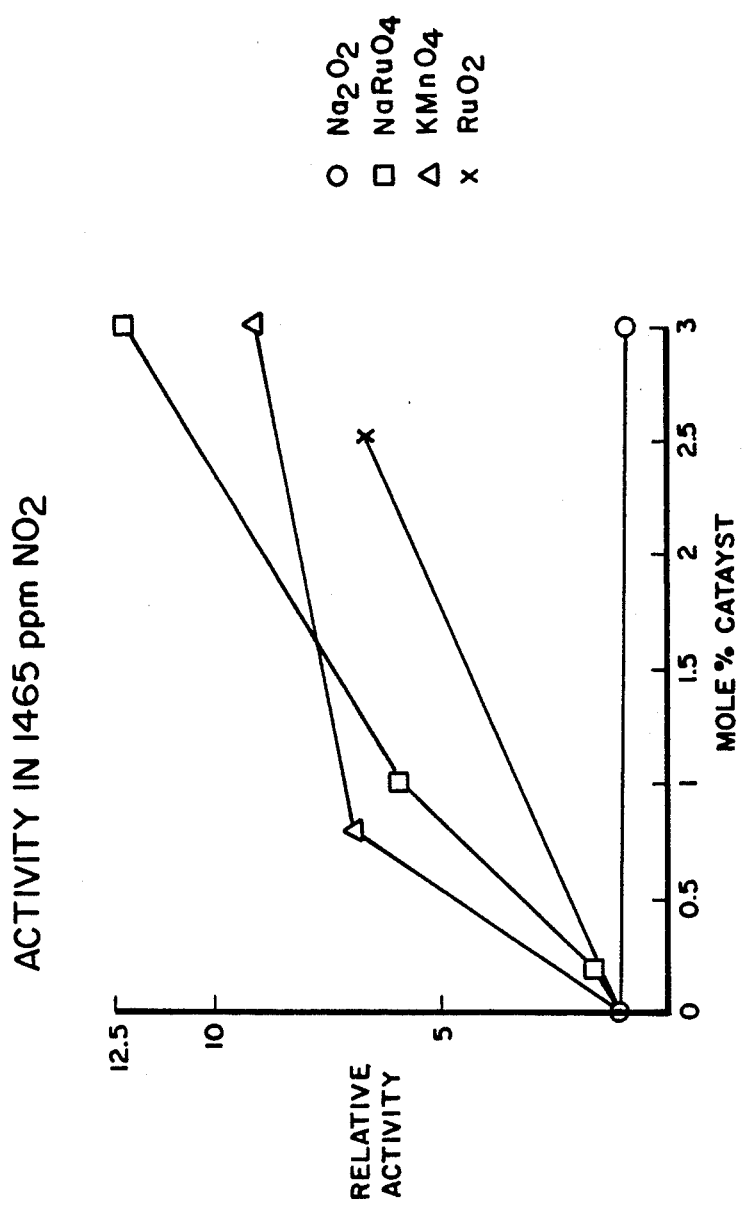

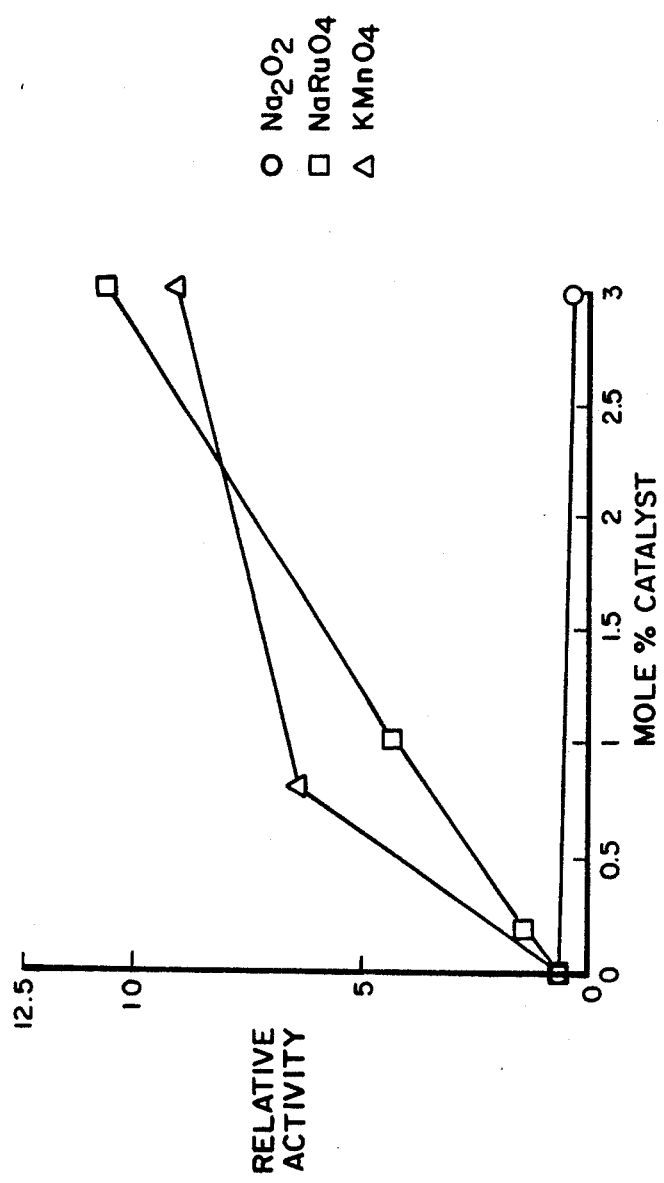

CATALYSTS FOR ABSORPTIVE AIR SEPARATION

TECHNICAL FIELD

The present invention is directed to the catalysis of the absorptive separation of oxygen from an oxygen-containing gas using certain transition metal oxides. More specifically, the present invention is directed to the catalysis of a nitrate-nitrite system with transition metal oxides showing effective redox chemistry.

BACKGROUND OF THE PRIOR ART

It is known in the prior art to absorb oxygen from oxygen-containing gases using various chemically binding agents to extract available oxygen from gas streams, such as air. For instance, it is known to use barium oxide, sodium manganese oxide, strontium oxide, mercury, copper chloride, praseodymium or cerium oxides, chrome oxides, strontium-chromium oxides, alkali metal nitrate-nitrites, and alkali metal peroxides to reversibly absorb oxygen from an oxygen-containing fluid.

Exemplary of the nitrate-nitrite oxygen absorption system, is U.S. Pat. No. 4,132,766 in which oxygen is extracted from air using alkali metal nitrate and nitrite molten salt liquids. The patent addresses the problem of decomposition of the molten salt liquids to oxides or superoxides. The patent further alludes to the problem with the presence of water and carbon dioxide in the feed air to an absorptive separation of oxygen from air using such a nitrate-nitrite system, as well as other known chemical absorptive separations of oxygen.

U.S. Pat. No. 4,287,170 disclosed an improvement in nitrate-nitrite absorptive chemical separation of oxygen from air, wherein additional trace quantities of oxygen are removed from an initial separation effluent, using an oxygen scavenger, such as manganese oxide. Other metallic oxygen scavengers are mentioned such as copper, iron, nickel, cobalt, vanadium, tin, chromium, lead and bismuth oxides. These oxides are not mixed with the nitrate-nitrite bath, but are contained in the separately operated closed-circuit scavenger subcycle.

U.S. Pat. No. 4,340,578 discloses yet another improvement in oxygen separation from air streams using a chemical absorptive separatory agent, including nitrate-nitrite molten salt baths, wherein such bath contains an additional amount of peroxide and superoxide. It is noted in this patent that the nitrate-nitrite molten salt bath is susceptible to decomposition into the respective metal oxide, peroxides and super oxides, which will have a detrimental affect on salt concentrations, as well as corrosion of process equipment.

In U.S. Pat. No. 4,529,577 it is noted that oxide levels in a molten salt bath or oxygen absorptive separation from oxygen-containing gas, had previously been maintained in the 1 to 2% range in order to minimize corrosion. The presently discussed patent teaches that these oxides should be maintained below 1 mole %, based upon sodium peroxide, in order to avoid extensive corrosion problems in such an overall process.

It can be seen that alkali metal oxides including peroxides and superoxides used in chemical absorptive separations, such as the alkali metal nitrate-nitrite systems, have been known in the prior art to provide necessary catalysis to that separatory process, but are known in the prior art to be deactivated by water and carbon dioxide, which are typically found in air, the most prevalent source of an oxygen-containing gas from which oxygen would be separated. Additionally, it has been noted that nitrogen dioxide deactivates the alkali metal oxides present in an alkali metal nitrate-nitrite molten salt bath, despite the utility of nitrogen dioxide to avoid the decomposition of the nitrate-nitrite system. Accordingly, a problem exists in the prior art with the use of alkali metal oxides as catalysts for a nitrate-nitrite oxygen separatory system. Such alkali metal oxides are typically removed from a continuously operating process by reaction with the materials of construction of the process plant, reaction with the feed impurities presently existing in untreated air, such as water and carbon dioxide, and by vaporization of the alkali metal oxides at the high temperatures of operation necessary for alkali metal nitrate-nitrite molten salt bath separatory systems. Once the alkali metal oxide levels in the nitrate-nitrite salt mixture are removed or reduced in concentration, this oxygen separatory reaction does not occur at commercially feasible or economic rates.

In order to overcome this problem with alkali metal oxide catalysts in chemical absorptive separatory systems, such as the alkali metal nitrate-nitrite system, it has been suggested to replenish the alkali metal oxides continuously during the continuous operation of the underlying process. Alternatively, it has been suggested to generate additional alkali metal oxide species in situ, presumably by the decomposition of the nitrate-nitrite system to the detriment of that systems concentration in the overall process.

Another teaching of the necessity of alkali metal oxides for catalysis in such systems is disclosed (F. Pariccia and P. G. Zambonin, J. Phys. Chem. 78, 1693 [1974]). Such alkali metal oxides are present in the form of $O^{2-}$, $O_2^{2-}$ and $O_2-$ (P. G. Zambonin, Electroanalytical Chem. and Interface Electrochemistry, 45, 451 [1973]). Additionally, it is also taught elsewhere in the prior art that water and carbon dioxide react with the alkali metal oxides in molten alkali nitrates, as set forth in (P. G. Zambonin, Anal. Chem. 44, 763 [1972]; P. G. Zambonin, Anal. Chem. 43, 1571[1971]). The art has recognized that the removal of these alkali metal oxides by any mechanism or theory, results in the slow kinetics of reaction for the oxygen uptake in a nitrate-nitrite system. as set forth in (F. Palimisano, L. Sabbatini and P. G. Zambonin, J. Chem. Soc. Faraday Trans. 1, 80, 1029 [1984]; D. A. Nissen and D. E. Meeker, Inorg. Chem. 22, 716 [1983]). However, the art has recognized that such alkali metal oxides can be generated in situ to replace those that are lost by various mechanisms, but this results in a decrease in the alkali metal nitrate-nitrite (C. M. Kramer, Z. A. Munin and K. H. Stern, High Temp. Sci. 16, 257 [1983]).

Transition metal oxides are known to have extensive redox chemistry (F. A. Cotton and G. Wilkinson, *Advanced Inorganic Chemistry*, 4th Ed. John Wiley and Sons. Inc. New York, 1980), and in contrast to alkali metal oxides, form less stable oxy-anions (K. H. Stern, J. Chem Education. 46, 645 [1969]). The redox potentials of alkali metal nitrite is known from (M. H. Miles and A. N. Fletcher, J. Electrochem. Soc., 127, 1761 [1980]). The redox behavior of various transition metal compounds in molten salts has also been discussed in the prior art (D. H. Kerridge "Molten Salts as Nonaqueous Solvents", *The Chemistry of Nonaqueous Solvents.* J. J. Lagowski, ed., Academic Press, New York, 1978, pages 269–329). Finally, it is known in the prior art that oxide formation from a nitrate-nitrite molten salt bath can be suppressed by the introduction of additional amounts of nitrogen dioxide (E. Plumat. A. Labani and M. Ghodsi, J. Electrochem. Soc. 130, 2192 [1983]).

The present invention overcomes the problem of adequately catalyzing a chemical absorptive separation of oxygen from a oxygen-containing gas, wherein corrosion problems are minimized, water and carbon dioxide contamination do not constitute significant operational problems and an unexpected heightened activity is recognized to the benefit of the overall oxygen separatory process.

BRIEF SUMMARY OF THE INVENTION

The present invention is directed to a method for separating oxygen from an oxygen-containing gas comprising reacting an oxygen acceptor with said gas in an absorption reaction, to produce an oxygen-depleted gas effluent, separately decomposing the oxidized acceptor to yield oxygen and regenerated oxygen acceptor, the improvement comprising adding to the oxygen acceptor, a catalytic amount of the transition metal oxide selected from the group consisting of oxides of manganese, ruthenium, rhenium, osmium, rhodium, iridium and mixtures thereof.

Preferably, the method is performed in a continual manner, whereby the regenerated oxygen acceptor is recycled to react with gas in said absorption reaction.

The oxygen acceptor can be selected from the group consisting of alkali metal nitrates and nitrites, oxides of alkali metals including oxides, peroxides or superoxides or mixtures thereof.

Optimally, the transition metal oxide is selected from the group consisting of $NaRuO_4$, $KMnO_4$, $MnO_2$, $RuO_2$ and mixtures thereof.

Preferably, the transition metal oxide is present in an amount in the range of approximately 0.2 to 3 mole % of the oxygen acceptor.

Specifically, the method of the present invention is directed to recovering oxygen or nitrogen from air comprising reacting an oxygen acceptor with air, in an absorption reaction to produce a nitrogen-rich effluent, separately decomposing the oxidized acceptor to yield oxygen and regenerated oxygen acceptor, the improvement comprising adding to the oxygen acceptor a catalytic amount of the transition metal oxide, selected from the group consisting of oxides of manganese, ruthenium, rhenium, osmium, rhodium, iridium and mixtures thereof.

BRIEF DESCRIPTION OF THE DRAWINGS

FIG. 1 is a graph of the activity of the transition metal oxide species of the present invention ($NaRuO_4$, $KMnO_4$) as catalysts for the reversible reaction of oxygen with an alkali metal nitrate-nitrite molten salt bath, relative to the activity of alkali metal oxides of the prior art, for the same reaction.

FIG. 2 is a graph of relative activity of a catalyzed alkali metal nitrate-nitrite molten salt bath comparing low concentrations of the transition metal oxide catalyst of the present invention against high concentrations of the alkali metal oxide catalyst of the prior art.

FIG. 3 is a graph of the relative activity of a catalyzed alkali metal nitrate-nitrite molten salt bath when nitrogen dioxide is administered to reduce the insitu production of alkali metal oxides.

FIG. 4 is a graph of relative activity of a catalyzed alkali metal nitrate-nitrite molten salt bath, showing how catalytic activity is affected by nitrogen dioxide, which inhibits alkali metal oxide insitu formation and carbon dioxide which selectively reacts with alkali metal oxides in contrast to the transition metal oxides of the present invention

DETAILED DESCRIPTION OF THE INVENTION

The present invention provides transition metal oxide catalysts for enhancing the reversible oxygen binding of various oxygen selective chemical absorbents for use in a continuous process, for the separation of oxygen from an oxygen-containing gas, such as the recovery of oxygen from air to result in either an oxygen product, or two products, oxygen and nitrogen in commercially acceptable purities.

The chemical absorptive separatory systems of the present invention, which can be successfully and unexpectedly catalyzed with the addition of certain transition metal oxides, include known oxygen acceptor materials such as alkali metal nitrates and nitrites and alkali metal oxides, peroxides or superoxides. Oxygen segregation from oxygen-containing gas can be done in either a batch or continuous mode.

Typically, oxygen is separated from the oxygen-containing gas by a regenerative chemical process. The oxygen-containing gas is contacted with an oxygen acceptor, such as a molten solution of alkali metal nitrate and nitrite salts at elevated temperature and pressure, causing the oxygen to react with the nitrite, and thereby increasing the proportion of nitrate in the salt solution. The oxidized oxygen acceptor is separated from the oxygen-depleted air, and then the oxygen partial pressure is reduced by, for example, reducing the pressure or elevating the temperature or both, thereby causing the release of relatively pure oxygen, which is collected. The oxygen acceptor, restored to its approximate original composition, is recycled to the oxidation step. Since the oxygen acceptor remains in the liquid state throughout the cycle, both salt to salt heat exchange and salt circulation are facilitated, making possible a continuous process of high efficiency. Such a process is set forth in U.S. Pat. No. 4,132,766, U.S. Pat. No. 4,287,170, U.S. Pat. No. 4,340,578, and U.S. Pat. No. 4,529,577, the text of which are hereby incorporated herein by reference. The subsequent discussion will utilize a preferred embodiment to describe the present invention, which is an alkali metal nitrate and nitrite molten salt solution utilized to extract oxygen from air, to result in an oxygen and/or nitrogen product, but it is understood that the description is applicable to the other systems described above and should not be deemed to be limited to the particular exemplary description of the preferred embodiment.

The transition metal oxides of the present invention include the oxides of manganese, ruthenium, rhenium, osmium, rhodium, iridium and mixtures thereof. Specifically, the preferred transition metal oxides are $NaRuO_4$, $KMnO_4$, $MnO_2$, $RuO_2$ and mixtures thereof. These transition metal oxides display appropriate redox chemistry for integration with the oxygen acceptors, most specifically, the alkali metal nitrate and nitrite systems. Although the present inventors do not wish to be held to any specific theory as to why the transition metal oxides identified above provide enhanced catalytic activity for regenerable oxygen acceptors, it is suggested that the interconversion of oxides, peroxides and super oxide species, gives a catalyzed oxygen-generating system. Such transition metal oxides possess redox chemistry which have several interconvertible oxidation states within the redox windows of the oxygen acceptors. most notably the alkali metal nitrate and nitrites. Other transition metal oxides outside the group set forth above are not deemed to have acceptable catalytic activity, because they are oxidized to their highest oxidation states by the known oxygen acceptors and notably by the alkali metal nitrate and nitrite solution, to stable oxides which would not render sufficient activity to catalyze the oxygen absorption-desorption reaction favored herein. Others of the transition metal oxides not identified above would decompose into oxygen and the elemental metal upon exposure to the oxygen acceptor. Some other transition metals may be unacceptably radioactive. Therefore, the transition metal oxides identified above, in contrast to the remaining transition metal oxides listed in the periodic table of the elements, are effective catalysts, because they have an appropriate redox potential.

The transition metal oxides of the present invention not only exhibit enhanced catalytic activity, but may be expected to reduce the problem of corrosion with materials of construction of the overall separatory process, because of the freedom of removing alkali and metal oxides from the oxygen acceptor bath and the potential of running the reaction and particularly the desorption reactor at lower temperatures. The transition metal oxide catalysts of the present invention also are not deactivated by water and carbon dioxide in the feed oxygen-containing gas or air to the process, which is attractive in that it eliminates the necessity for pretreatment of the feed to the process. Finally, the transition metal oxides of the present invention will not be as easily vaporized and lost from the system as the alkali metal oxides of the prior art.

With reference to the preferred embodiment of the present invention in which the oxygen acceptor is a molten salt solution of alkali metal nitrate and nitrite, the present invention will be set forth wherein the cyclic oxygen absorption and desorption is predicated on the following equation.

$$NO_3^- \underset{k_{-1}}{\overset{k_1}{\rightleftharpoons}} NO_2^- + \tfrac{1}{2}O_2 \quad (1)$$

The feasibility of using Equation 1, relies upon the thermodynamics and the kinetics of the reaction, which have been shown to be strongly dependent upon the amount of alkali metal oxides in the solution. These alkali metal oxides, which are present as oxides, peroxides and super oxides, act as catalysts for Equation 1, through a redox mechanism. The prior art has relied upon the addition of alkali metal oxides, such as $Na_2O_2$ or upon the insitu generation of oxide species by the thermal decomposition of the nitrate salt itself, to achieve reasonable reaction rates. These oxides, however, can be lost through a number of processes including vaporization and reaction with the containment vessel. Also, impurities in air, particularly carbon dioxide and water react with the oxides in the solution by reaction, such as Equation 2 and 3 below.

$$CO_2 + O^{2-} \rightleftharpoons CO_3^{2-} \quad (2)$$

$$H_2O + O^{2-} \rightleftharpoons 2-OH \quad (3)$$

Without the presence of such oxides the kinetics of Equation 1 are very slow and problematic from a commercial, economic perspective.

The present invention overcomes the problems of the prior art alkali metal oxides by using the alternative transition metal oxides of the present invention for catalyzing Equation 1, wherein such catalytic oxides are not effected by air impurities, such as water and carbon dioxide, and have been found unexpectedly to impart faster kinetics to the reaction shown in Equation 1. The transition metal oxides of the present invention catalyze these reactions by having the appropriate redox potential necessary to react in a reversible manner with the nitrate and nitrite of the molten salt bath, constituting the oxygen-selective oxygen acceptor. The transition metal oxide catalyst of the present invention also have unstable hydroxides and carbonates at the operating temperatures of the process, so that the presence of carbon dioxide and water will not affect the kinetics of the catalyzed reaction, because the reaction of the transition metal oxides with such contaminants will not remove the oxides on a permanent basis from the reaction system. Such reaction temperature is preferably in the range of 450° to 675° C. for the nitrate-nitrite oxygen acceptor system.

The transition metal oxides of the present invention are effective catalysts because of their active redox chemistry which results in the formation of less stable oxy-anions than alkali metal oxides. The redox chemistry of the transition metal oxides of the present invention when used with an alkali metal nitrate-nitrite molten salt solution are found to be reversible, so that they can adequately catalyze the reaction shown in Equation 1. These transition metal oxides of the present invention are not overly oxidizing so that they are not irreversibly reduced by the nitrite and nitrate half reactions, Equations 4 and 5. respectively below.

$$NO_2^- \rightarrow NO_2 + 1e^- \quad (4)$$

$$NO_3^- \rightarrow NO_2 + \tfrac{1}{2}O_2 + 1e^- \quad (5)$$

In addition, the transition metal oxides of the present invention are not overly reducing so as to be irreversibly oxidized by the nitrate half reaction, Equation 6 below.

$$NO_3^- + 2e^- \rightarrow NO_2^- + O^{2-} \quad (6)$$

The catalytic activity of the select transition metal oxides of the present invention has been positively ascertained by suppressing the in situ formation of alkali metal oxides from the alkali metal nitrate and nitrite molten salt bath so that the activity of the alkali metal oxides of the prior art does not interfere with the apparent measured catalytic activity of the transition metal oxides. This is accomplished by introducing nitrogen dioxide into the tests performed with the transition metal oxides in order to equilibrate the alkali metal oxides by Equation 7.

$$2NO_3^- \rightleftharpoons 2NO_2 + \tfrac{1}{2}O_2 + O^{2-} \quad (7)$$

Tests were also performed to confirm the continued activity of the transition metal oxide catalyst of the present invention in the presence of carbon dioxide and water, which would be indicative of their performance in untreated air as a feed to the overall process.

For testing purposes, isothermal experiments at 600° C. were performed on a thermogravimetric (TGA) apparatus using sodium nitrate (Fisher ACS reagent grade). Catalytic activity for Equation 1 was determined by switching a test sample contained in a platinum pan between an oxygen-containing and a non-oxygen-containing atmosphere and measuring the rate of oxygen uptake and release. Nitrogen dioxide, carbon dioxide and water were used to suppress alkali metal oxide catalysts. The transition metal oxides of the present invention being tested for catalytic activity were mechanically mixed with the sodium nitrate generally in concentrations between 1 and 3 mole %.

As a base case, a 3 mole % sodium peroxide in sodium nitrate sample was tested first. The sodium peroxide addition catalyzed Equation 1 effectively at 600° C. However, the catalytic activity was greatly diminished with the introduction of nitrogen dioxide and was further decreased with the addition of carbon dioxide. Table 1 lists a number of transition metal oxides tested in the above manner for catalytic activity at 600° C.

TABLE 1

| Transition Metal Oxide Added | Mole % | Catalyst Under 1465 ppm $NO_2$ | Catalyst Under 1343 ppm $NO_2$ + 438 ppm $CO_2$ |
|---|---|---|---|
| $NaRuO_4$ | 0.2 to 3.0 | Yes | Yes |
| $KMnO_4$ | 0.8 to 3.0 | Yes | Yes |
| $MnO_2$ | 3 | Yes | Yes |
| $V_2O_5$ | 3 | No | No |
| $Fe_2O_3$ | 2 | No | No |
| $Na_2WO_4$ | 3 | No | No |
| $Na_2CrO_4$[a] | 3 | — | No[a] |
| $Ag_2CrO_4$ | 2 | No | No |
| $RuO_2$ | 2.5 | Yes | Yes[a] |

[a]tested under 500 ppm of $CO_2$ only

In addition to the above experiments a 50/50 mole % (Na/K) $NO_3$ salt to which was added 0.54 mole % $KMnO_4$ has been demonstrated to be catalytically active for Equation 1 at 650° C. under 1465 ppm of $NO_2$.

To quantify the above results, the height of the derivative trace from the TGA was measured and was taken as a value for the relative catalytic activity of the catalyzed salt. The height of the derivative trace corresponds to the $\Delta$ wt %/$\Delta$ t at the points of gas switching. The relative activity of sodium nitrate under 1465 ppm of nitrogen dioxide without any added catalyst is taken to be 1. Table 2 below summarizes the relative catalytic activities of salts with various candidate catalysts added when tested under nitrogen dioxide and nitrogen dioxide with carbon dioxide.

TABLE 2

| Catalyst Added | 1465 ppm $NO_2$ | Relative Activity Under 1343 ppm $NO_2$ + 438 ppm $CO_2$ |
|---|---|---|
| None | 1[a] | 0.57 |
| 3% $Na_2O_2$ | 0.85 | 0.34 |
| 3% $NaRuO_4$ | 12.0 | 10.6 |
| 1% $NaRuO_4$ | 5.9 | 4.3 |
| 0.2% $NaRuO_4$ | 1.6 | 1.4 |
| 3% $KMnO_4$ | 9.1 | 9.0 |
| 0.8% $KMnO_4$ | 6.8 | 6.3 |
| 3.0% $MnO_2$ | 10.5 | 8.3 |
| 2.5% $RuO_2$ | 6.7 | (b) |

[a]Normalization standard set to one.
[b]Shown to be active in 500 ppm $CO_2$. Not tested in $NO_2/CO_2$ mixture.

The relative activity of a sodium peroxide catalyzed salt under nitrogen dioxide is essentially the same regardless of starting sodium peroxide concentration because nitrogen dioxide converts sodium peroxide to nitrate. The relative activity of sodium nitrate containing an alternate catalyst is proportional to catalyst concentration.

The effect of water on the prior art catalysts and the catalyst of the present invention were also examined to see the effect of water on the comparative catalytic activity of the present invention catalyst in comparison to those catalysts of the prior art. When sodium nitrate is catalyzed with 3 mole % of sodium peroxide and is exposed to feed gas containing water (an amount near the dew point at room temperature), it has been found by the present inventors to have a relative activity of only approximately 0.9, using as a reference the activity of sodium nitrate under 1465 ppm of nitrogen dioxide wherein the activity is 1.0. Using the same activity scale, the present inventors experimentally catalyzed sodium nitrate with 3 mole % of various transition metal oxides of the present invention and exposed the catalyzed sodium nitrate to nitrogen dioxide, carbon dioxide and water with the resulting activities given in Table 3 below.

TABLE 3

| Transition Metal Oxide (3 mole %) | Relative Activity Under $NO_2$ + $CO_2$ + $H_2O$ |
|---|---|
| $NaRuO_4$[a] | 10.0 |
| $KMnO_4$[a] | 11.7 |
| $MnO_2$[b] | 7.9 |

[a]1151 ppm $NO_2$ + 375 ppm $CO_2$ + $H_2O$ (dew point near room temperature)
[b]1343 ppm $NO_2$ + 438 ppm $CO_2$ + $H_2O$ (dew point near room temperarure)

As is apparent from a comparison of Table 3 with the activity of 0.9 experimentally derived for sodium peroxide, the transition metal oxides of the present invention provide enhanced activity, which is not diminished by known poisons to the catalytic activity of the catalysts of the prior art. This is exemplary of the unexpected results in the present invention for transition metal oxides selected from the above-identified groups.

The benefits of the transition metal oxides of the present invention over the prior art oxide catalyst will now be demonstrated in greater detail with reference to the drawings.

FIG. 1 shows the effect of atmospheric conditions on the activity of sodium peroxide, sodium ruthenium oxide and potassium permanganate at 3 mole % in sodium nitrate. Point 1 of the graph in FIG. 1 corresponds to the initial activity of the salt under an oxygen/nitrogen sweep. Point 2 corresponds to the activity after one hour under this oxygen/nitrogen sweep. As can be seen, the activities of the salts under the response of the various catalysts increase with time under these conditions because of the production of additional catalytic oxides by Equation 7 above. The oxygen/nitrogen sweep continually removes the nitrogen dioxide resulting in a build-up of $O^{2-}$. In the case of the transition metal oxide catalysts of the present invention, this rise in activity is also due in part to catalyst dissolution in the melt or to catalyst activation reactions. It is significant to note that at points 1 and 2 of the graph of FIG. 1, the activities of the sodium ruthenium oxide and the potassium permanganate catalyzed salts are higher than the sodium peroxide catalyzed salt. At point 3 in the graph of FIG. 1, 1465 ppm of nitrogen dioxide is added to the oxygen/nitrogen sweep. This causes the reaction of Equation 7 above to shift back to the left converting catalytic oxide to nitrate. The sodium peroxide catalyzed salt is thus deactivated since the equilibrium level of $O^{2-}$ under these conditions is very low. In the transition metal oxide catalyst containing salts of the present invention, the non-transition metal oxides, $O^{2-}/O_2^{2-}/O_2^-$, are converted to nitrate. However, the transition metal oxides of the present invention are unaffected with respect to their catalytic properties, and the salts remain active for oxygen uptake. The introduction of nitrogen dioxide causes the activities of all salts to become constant with time since an equilibrium level of oxide is established by the reaction of Equation 7, unlike points 1 and 2 where the nitrogen dioxide produced was continually removed. This introduction of nitrogen dioxide clearly demonstrates that the transition metal oxides of the present invention are true catalysts for the oxygen reversibility of sodium nitrate, since it acts only to convert non-transition metal oxides back to nitrate without introducing additional chemical species. At point 4, 438 ppm of carbon dioxide and 1343 ppm of nitrogen dioxide are introduced into the oxygen/nitrogen sweep gas. This further reduces the activity of the sodium peroxide catalyzed salt by about one-half. The oxide equilibrium level determined by Equation 7 and Equation 2. above, is lower than under nitrogen dioxide alone. The activity of the transition metal oxide catalyst of the present invention in the experimental salts are not affected by the presence of carbon dioxide. This is particularly significant since now removal of carbon dioxide will not be required in the gas separation processes using the present invention.

FIG. 2 is essentially the same as FIG. 1, except that the concentrations of sodium ruthenium oxide and potassium permanganate have been reduced to 1.0 and 0.8 mole %, respectively. The significance of the plot of the graph in FIG. 2 is that at a concentration of only about 1 mole %, the transition metal oxide catalysts of the present invention show higher activity than 3 mole % of sodium peroxide.

FIGS. 3 and 4 show the effect of increasing catalyst concentration upon the activity of the sodium nitrate salt bath in the presence of the oxygen/nitrogen sweep gas, when various catalyst poisons discussed above are added to the sweep gas. With regard to FIG. 3, the graph shows that an uncatalyzed salt bath (0 mole % catalyst) has very low initial activity. This activity does not improve in the presence of either nitrogen dioxide or with reference to FIG. 4 in the presence of nitrogen dioxide and carbon dioxide.

Accordingly, the transition metal oxides of the present invention described above have various unexpected enhancements in the catalysis of the reversible oxygen uptake and removal in a chemical absorptive process, particularly those containing alkali metal nitrate and nitrite molten salt baths. Not all of the transition metal oxides have this activity. Only those transition metal oxides identified above which have good redox chemistry with regard to the various oxygen acceptor and oxygen donor systems identified above have the appropriate catalytic activity. These transition metal oxide catalysts of the present invention have been shown to be more active than the prior art sodium peroxide catalyst.

Accordingly, this higher catalytic activity may lower the temperature of the process, most specifically in oxygen desorber units. This lower temperature will reduce corrosion and nitrogen dioxide levels. The transition metal oxide catalysts of the present invention are not deactivated by nitrogen dioxide, carbon dioxide or water. This will eliminate the need for feed gas pretreatment, such as removal of water and carbon dioxide from air when separating oxygen from nitrogen.

The present invention has been described with reference to several preferred embodiments. However, the scope of the invention should not be limited to such preferred embodiments, but rather should be ascertained from the claims which follow.

We claim:

1. In a method for separating oxygen from an oxygen-containing gas comprising reacting an oxygen acceptor consisting essentially of a molten salt solution of alkali metal nitrates and nitrites with said gas in an absorption reaction to produce an oxygen-depleted gas effluent, separately decomposing the oxidized acceptor to yield oxygen and regenerated oxygen acceptor, the improvement comprising adding to the oxygen acceptor a catalytic amount of a transition metal oxide selected from the group consisting of oxides of manganese, ruthenium, rhenium, osmium, rhodium, iridium and mixtures thereof.

2. The method of claim 1 wherein the absorption reaction is performed in a continual manner whereby the regenerated oxygen acceptor is recycled to react with gas in said absorption reaction.

3. The method of claim 1 wherein the transition metal oxide is selected from the group consisting of $NaRuO_4$, $KMnO_4$, $MnO_2$, $RuO_2$ and mixtures thereof.

4. The method of claim 1 wherein the transition metal oxide is present in an amount in the range of approximately 0.2 to 3 mole % of the oxygen acceptor.

5. The method of claim 1 wherein the transition metal oxide is present in the oxygen acceptor in combination with alkali metal oxides.

6. In a method for recovering oxygen or nitrogen from air comprising reacting an oxygen acceptor consisting essentially of a molten salt solution of alkali metal nitrates and nitrites with air in an absorption reaction to produce a nitrogen-rich effluent, separately decomposing the oxidized acceptor to yield oxygen and regnerated oxygen acceptor, the improvement comprising adding to the oxygen acceptor a catalytic amount of a transition metal oxide selected from the group consisting of oxides of manganese, ruthenium, rhenium, osmium, rhodium, iridium and mixtures thereof.

7. The method of claim 6 wherein the transition metal oxide is selected from the group consisting of $NaRuO_4$, $KMnO_4$, $MnO_2$, $RuO_2$ and mixtures thereof.

8. The method of claim 6 wherei the transition metal oxide is present in the oxygen acceptor in combination with alkali metal oxides.

* * * * *